United States Patent [19]

Hendrick et al.

[11] 4,300,706
[45] Nov. 17, 1981

[54] LUGGAGE CARRIER FOR A THREE-WHEEL MOTORCYCLE

[76] Inventors: Pete Hendrick, 18301 SW. 293rd St., Homestead, Fla. 33030; James J. Arias, 11561 SW. 186 St., Miami, Fla. 33157

[21] Appl. No.: 162,726

[22] Filed: Jun. 25, 1980

[51] Int. Cl.³ .................... B60R 9/00; B02D 61/08
[52] U.S. Cl. ........................ 224/31; 180/210; 224/32 A; 224/273; 280/769
[58] Field of Search ............ 224/30 R, 31, 32 R, 224/32 A, 273; 280/202, 289 A, 760, 769; 180/210–216; 297/129, 191, 243

[56] References Cited

U.S. PATENT DOCUMENTS

| | | | |
|---|---|---|---|
| 2,629,527 | 2/1953 | Brown | 224/32 R |
| 3,575,436 | 4/1971 | Templeton | 224/32 R |
| 3,850,353 | 11/1974 | Foulds | 224/31 |
| 4,176,771 | 12/1979 | Dubroc, Sr. | 224/32 A X |
| 4,247,030 | 1/1981 | Amacker | 280/769 X |

FOREIGN PATENT DOCUMENTS 689858  4/1953  United Kingdom ............ 224/31

*Primary Examiner*—Stephen Marcus
*Attorney, Agent, or Firm*—John Cyril Malloy

[57] ABSTRACT

A luggage carrier for a three-wheel motorcycle is disclosed which forms a portion of a modification of the motorcycle, which is of a type generally known as an ATC, all-terrain cycle. The luggage carrier provides a generally rectangular flat-bed area and a pair of fenders, suspended over the rear wheel area of the cycle. A supporting frame of the flat-bed includes a forward extension to overlie the normal seat position of the cycle. The seat is unlatched from its normal position and is fixed atop the forward extension, after a pair of latch brackets have been removed from the bottom of the seat and remounted to a bottom portion of the forward extension in a compatible relation to a mounting and latch means conventionally provided in the seat mounting area of the cycle.

9 Claims, 6 Drawing Figures

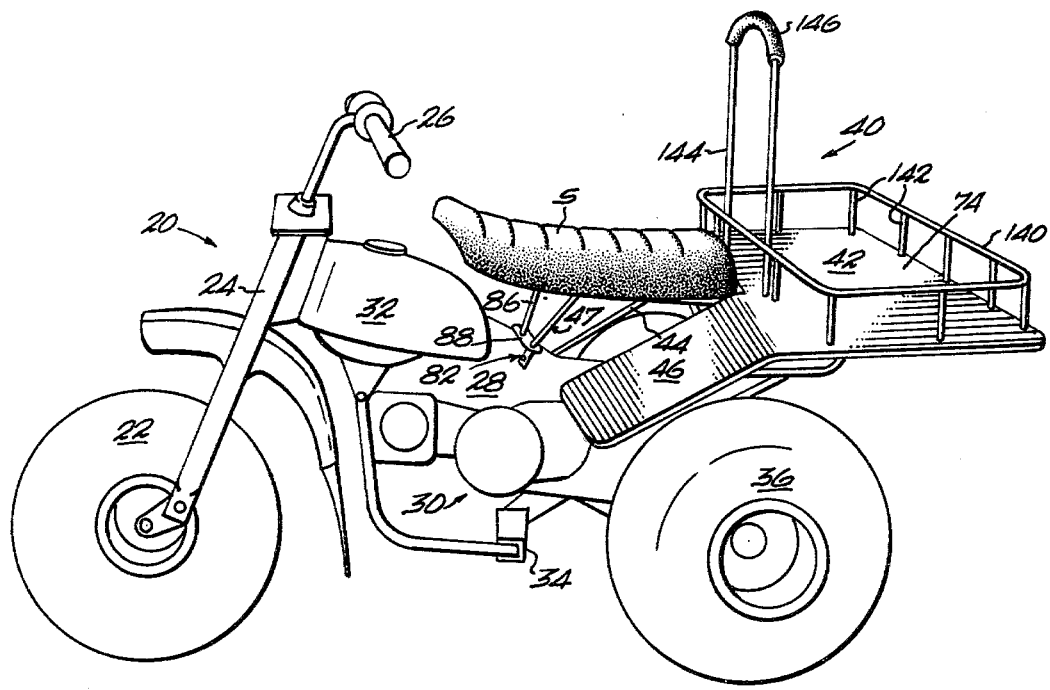

LUGGAGE CARRIER FOR A THREE-WHEEL MOTORCYCLE

BACKGROUND OF THE INVENTION

The present invention pertains to a luggage carrier, and more particularly to a luggage rack as a portion of a modification of a three wheel motorcycle of a type commonly known as a ATC or all-terrain cycle. As the name implies, vehicles of this type will traverse very rough and hilly off-road terrain and, consequently, are widely used by campers, hunters, fishermen, etc.

Unfortunately, ATC's provide absolutely no facilities for the luggage or gear associated with sports of this nature, and, therefore, a trailer is virtually a necessity. However, trailers impose some limitations on their use and require extra expense and care in operation of the cycle.

U.S. Pat. No. 4,176,771 to Tyrone P. Dubroc, Sr., discloses a carrier or rack for an ATC. However, this rack is merely in the nature of an open framework which is bolted to the ATC in four places.

Your applicants device provides a flat-bed area, preferably fenced in, and includes an extension which attaches to the existing seat. Latch bracket means from the seat are relocated on the bottom of the extension for engagement by the existing conventional latch means provided on the ATC. The simple operation of a single lever permits the installation or removal of the seat and luggage carrier in assembly. The relocation of the seat to a higher elevation provides the operation of the cycle with a better view of the area ahead because of visibility obstructions in off-road travels such as tall weeds, rocks, small hills or mounds, etc.

Therefore, one of the principal objects of the present invention is to provide a flat-bed carrier for a three wheeled type of motorcycle which is positioned over the pair of rear wheels thereof, and includes a forward extension for attachment thereto of the existing seat of the cycle in an elevated and somewhat forward position, relative to its normal position.

A further object of the invention is to utilize the existing conventional latch brackets from the seat by relocating the brackets on the bottom of the forward extension in position compatible with the conventional mounting means provided on a three wheeled motorcycle.

Another object of the instant invention is to form the flat-bed integral with a pair of rear wheel fenders.

A still further object of the present invention is to provide a fence around the flat-bed area which is sheet metal covered in an interegal relation with the fenders.

Yet another object of the present invention is to provide a vertical head rest extension relative to the back of the seat.

BRIEF DESCRIPTION OF THE DRAWINGS

FIG. 1 is a side perspective view of a conventional three wheeled motorcycle of the type generally called an ATC or all-terrain cycle, including the carrier bed and modification of the seat arrangement of the present invention;

FIG. 2 is a similar perspective view of a conventional ATC without the carrier or seat location modification;

DESCRIPTION OF A PREFERRED EMBODIMENT

Figure 3:
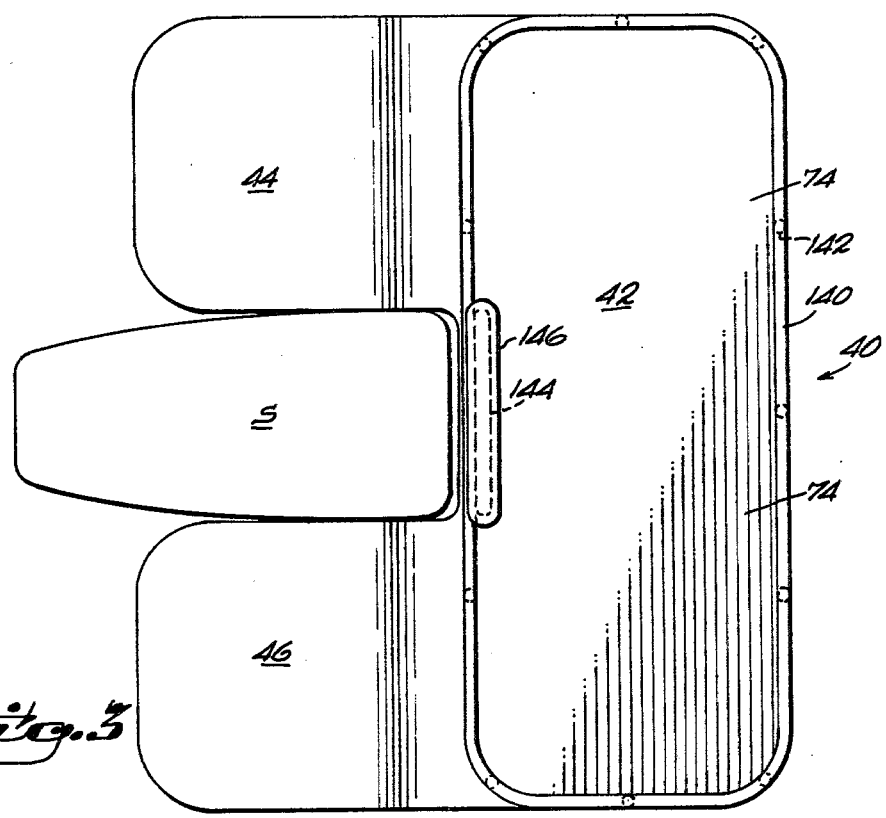
FIG. 3 is a top plan view of the carrier and extension with the seat attached thereto.

With reference to the drawings, and particularly to FIG. 2, a prior art device is disclosed in the nature of a three wheeled motorcycle or ATC, all-terrain cycle 10, as is currently commercially available and in very wide useage. It is to be particularly noted that the seat thereof has a front end portion, engaged against a rear end portion of the gas tank T. The seat S, and fender assembly F are conventionally unitarily attached to a center frame portion of the cycle by latch means including a pair of female latch brackets fixed beneath the seat. A toggle type latch, built into a top frame portion of the cycle is selectively operated to engage or release the seat and fender assembly.

Referring now to FIG. 1, the modified ATC is indicated generally at 20 and conventionally includes a front wheel 22 mounted in a fork 24 with a handlebar control 26. Conventional frame means 28, motor 30, gas tank 32, footrest 34 and a pair of rear wheels such as 36 are disclosed.

Figure 4:
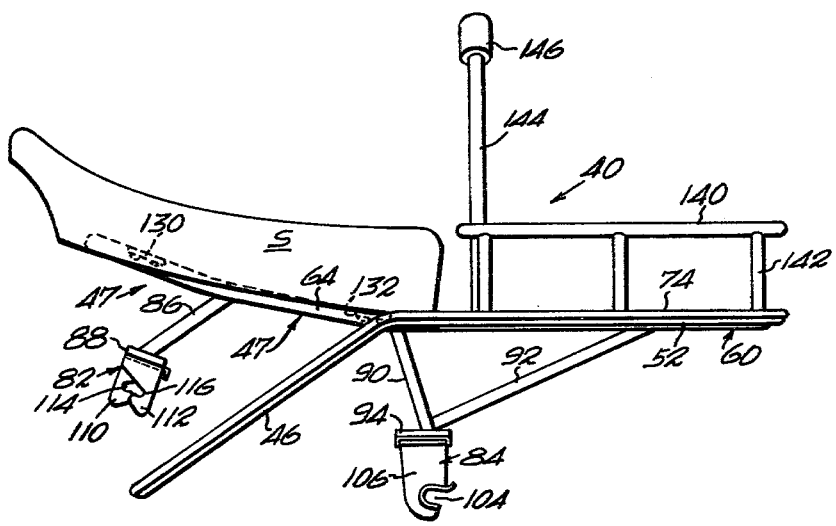
FIG. 4 is a side elevational view of FIG. 3.
Figure 5:
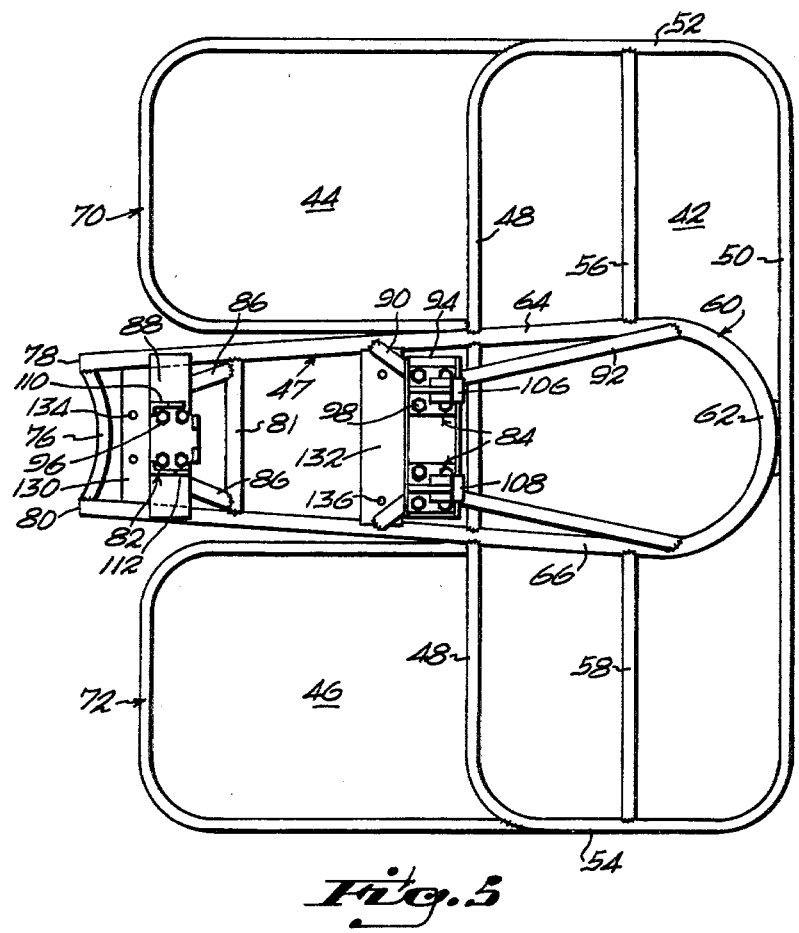
FIG. 5 is a bottom plan view of FIG. 3 with the seat removed.

The carrier attachment, indicated generally at 40 includes a generally rectangular flat-bed carrier portion 42, formed intergrally with a pair of rear wheel fenders 44, 46 and a forward extension 47. FIGS. 4 and 5 to carry the seat S. With further reference to FIG. 5, a perimeter frame for the flat-bed carrier portion 42 is comprised of front and back tubular portions 48, 50 and a pair of transverse intermediate tube members 56, 58 connecting between sides 52, 54 and a central elongated, forwardly extending, generally U-shaped tubular member 60. U-shaped member 60 includes a curved rear end 62, fixed as by welding intermediate the length of the back tube 50. It should be here noted that all the structural members are preferably unitarily connected by welding. A pair of legs 64, 66 of U-member 60 extend forwardly in a fixed relation to transverse tubes 56, 58, and in a bisecting relation to front tube 48 to define the front extension position, indicated generally at 47.

A pair of generally U-shaped side fender defining tubes 70, 72 extend forwardly from front tubular member 48, and, as best illustrated in FIGS. 1 and 3, the flat-bed and fender frame members are unitarily covered by sheet metal 74.

With particular reference to FIGS. 4 and 5, the central elongated U-shaped member 60 includes a forward curved connector tube 76 between front ends 78, 80 thereof and a tranverse tube 81 somewhat rearwardly thereof. A pair of female latch brackets, including a front female latch bracket 82 and rear female latch bracket means 84 are fixed respectively to the extension portion 47 at forward and intermediate portions of the U-shaped tubular member 60. To this end a pair of forward, downwardly forwardly angled arms 86 are fixed at a bottom end to a first crossplate 88, and forward and rear pairs of arms 90, 92 connect between U-member 60 and a second crossplate 94. Front female latch bracket 82 is bolted at 96 to the first cross plate 88 and the rear female latch bracket means 84 is bolted at 98 to the crossplate 94.

It should be here noted, that the latch bracket members are part of the prior art device of FIG. 2 and are fixed directly to the underside of the seat S for engagement by attachment means, illustrated schematically in FIG. 6, to be subsequently described. Therefore, in the prior art device, the seat is fixed directly to a central frame portion F, FIG. 6, by means of female latch brackets 82, 84.

Figure 6:
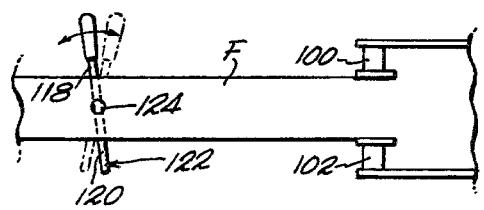
FIG. 6 is a generally schematic plan view of the seat attachment means provided on the cycles in FIGS. 1 and 2.

In the arrangement described above relative to FIGS. 4 and 5, the female latch brackets are located in an exact same spaced relations as they are when mounted on the seat S in FIG. 2 to be compatible with the male latch means, built into the ATC as in FIG. 6, which includes a pair of short rod portions 100, 102 for engagement within the open throats, such as 104 of each of a pair of female latches 106, 108, FIGS. 4 and 5 of rear latch bracket means 84.

Front female latch bracket 82 includes a pair of spaced apart downwardly extending arms 110, 112 including oppositely opening throats. 114, 116, FIG. 4 for engagement by opposite end portions 118, 120, FIG. 6 of the male latch arm 122, conventionally built into the ATC. Male latch arm 122 is generally of a spring loaded toggle type which pivots in the center as at 124.

A pair of transverse seat attachment members 130, 132 are fixed between the legs 64, 66 of U-member 60 in the same space apart relation as the conventional mounting of the female latch brackets 82, 84 to the seat S, and the screw attachment holes such as 134, 136 in transverse seat attachment members 130, 132 are preferably precisely located relative to the existing screwhole locations in the bottom of the seat as defined by screwholes in the latch brackets 82, 84.

Therefore, to modify the ATC of FIG. 2 to the condition of FIG. 1, it is only necessary to unlatch the seat, remove the latch brackets 82, 84 therefrom and to reattach said latch brackets to the crossplates 88, 94 by means of prelocated holes therein, and to attach the seat S to the transverse attachment members 130, 132 by means of the prelocated holes 134, 136 therein. The entire carrier attachment assembly 40 may then be mounted on the ATC in the conventional manner by means of the short rod portions 100, 102 and the male latch arm 122, FIG. 6 as above described.

In a preferred form, a fence rail 140 is supported about the periphery of the flat-bed carrier portion 42 by means of a plurality of spaced apart upright struts 142, and, an inverted U-shaped back rest 144 may be provided in a fixed relation to a front central portion of the flat-bed carrier portion 42, directly behind the seat S. As illustrated, a foam cushion 146 may be fixed about the top curved portion of 144.

While a preferred form of the instant invention has been herein disclosed, it will be evident to those skilled in the art that various changes and modifications can be made therein without departing from the true spirit of the invention as defined by the appended claims.

What is claimed is:

1. A carrier assembly for a motorcycle of a type having a front wheel, a pair of opposed side rear wheels, a seat including front and back female latch brackets removably attached thereto and a male attachment latch means fixed to a frame portion of the motorcycle in a position for selective manual operation thereof to engage or disengage the female latch brackets, said carrier assembly comprising a main carrier portion disposed rearwardly of the seat and above the rear wheels, a forward extension from said carrier portion, projecting generally over an area normally occupied by the seat, when the seat is unlatched and removed; generally downwardly projecting means, from said forward extension, for fixed attachment thereto of the front and back female latch brackets, when said brackets are removed from the seat, in identical spaced apart positions and locations relative to their normal positions and locations when fixed to the bottom of the seat, to permit selective manual operation of the male attachment latch means to engage or disengage the female latch brackets when fixed to said downwardly projecting means.

2. The carrier assembly as defined in claim 1 wherein said forward extension comprises a pair of spaced apart arms disposed in a pre-determined angular relation to said carrier portion to determine the location of the seat when said seat is secured to a pair of transverse attachment members, fixed in a predetermined spaced apart relation between said spaced apart arms.

3. The carrier assembly as defined in claim 2 wherein said generally downwardly projecting means comprises front and back pluralities of generally downwardly angled leg members fixed between said pair of spaced apart arms, and respective front and back crossplates, for removable attachment thereto of said front and back female latch brackets.

4. The carrier assembly as defined in claim 1 including a pair of forwardly downwardly extending fender portions from said main carrier portion.

5. The carrier assembly as defined in claim 4 wherein said main carrier portion and fender portions are formed from plurality of interconnected, properly configurated tubular members with a sheet metal covering fixed theratop.

6. The carrier assembly as defined in claim 5 including a fence fixed to and extending upwardly from a periphery of said main carrier postion.

7. The carrier assembly as defined in claim 6 wherein said fence in comprised of a laterally extending peripheral rail interconnected to said main carrier portion by a plurality of spaced apart upright struts.

8. The carrier assembly as defined in claim 1 including a back rest, fixed to and extending upwardly from a center front edge portion of said main carrier portion.

9. The carrier assembly as defined in claim 8 wherein said back rest comprises an inverted U-shaped member having a foam cushion disposed about a curved upper end thereof.

* * * * *